Sept. 7, 1937.   E. ROSS ET AL   2,092,185
SOUND UNIT AND FILM DRIVE THEREFOR
Filed July 10, 1935
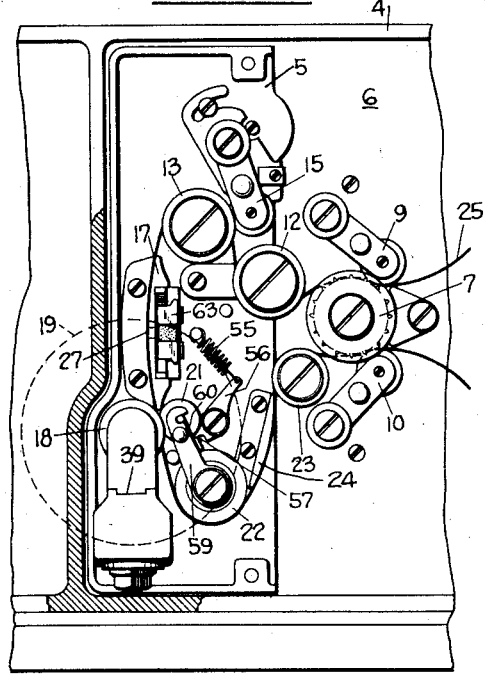
FIG_1
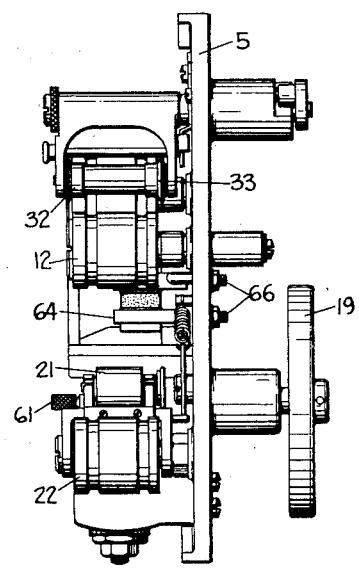
FIG_2
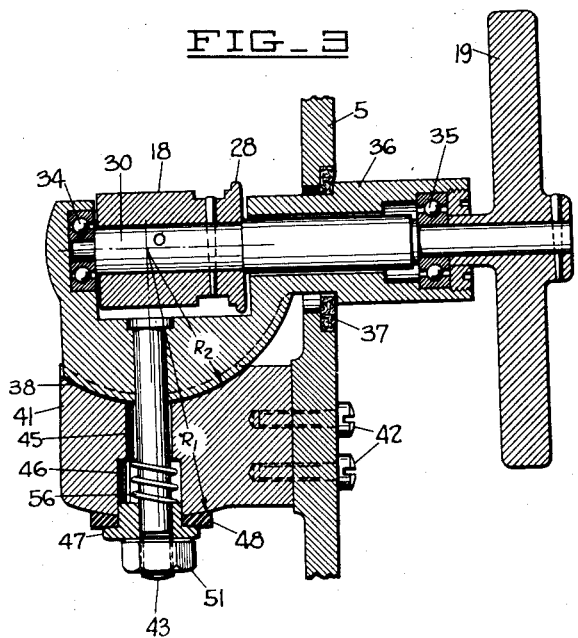
FIG_3
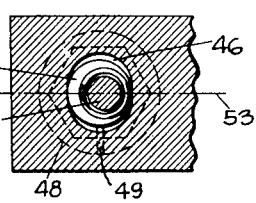
FIG_4
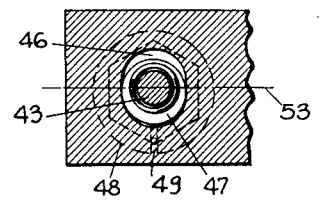
FIG_5
INVENTORS
Ernest Ross
Harold J. Hasbrouck, Jr.
BY
ATTORNEY Patented Sept. 7, 1937

2,092,185

UNITED STATES PATENT OFFICE 2,092,185

SOUND UNIT AND FILM DRIVE THEREFOR

Ernest Ross, Elmhurst, Long Island, and Harold J. Hasbrouck, Jr., Flushing, N. Y., assignors to United Research Corporation, Long Island City, N. Y., a corporation of Delaware Application July 10, 1935, Serial No. 30,742

9 Claims. (Cl. 179—100.3)

This invention relates to talking motion picture apparatus and particularly to that portion of the sound unit which continuously drives the film at the proper speed and maintains the film at the proper position with respect to a beam of light.

One of the essentials for perfect sound recording or reproduction is that the film be driven at a constant uniform speed at at least one point, and that the sound track portion of the film be maintained in the proper spatial relationship at this point. In recording, a constant intensity light beam is modulated either in intensity or position before impression upon the light sensitive emulsion of a film. In reproduction, a constant intensity light beam is modulated by a sound track on a film and projected therethrough onto a light sensitive device. In both cases it is desirable that there be no film weave or variations in speed at the point where the film and light beam contact, known in the art as the translation point.

The present invention contemplates maintaining the film at a contant speed at the translation point by the use of inertia in the form of a flywheel, and guiding the film adjacent the translation point by mechanism which utilizes friction to introduce a transverse directional component to the film. The basic principle of this invention is disclosed in co-pending application Serial No. 28,648, filed June 27, 1935, and the method and certain specific apparatus are claimed therein. The present application discloses a novel mounting for a film guiding roller and flywheel.

The object of the invention, therefore, is to facilitate guiding and driving a linear record carrier in the form of a talking motion picture film past a translation point.

Another object of the invention is to facilitate adjustment of the film guiding means.

Other objects and specific features of the invention will be realized and the invention more fully understood by reference to the following description read in conjunction with the accompanying drawing, in which Fig. 1 is an elevational view of the film driving portion of a sound unit.

Fig. 2 is a side elevational view of the apparatus of Fig. 1.

Fig. 3 is a cross-sectional view of the mounting of the roller and flywheel adjusting mechanism; and Figs. 4 and 5 are cross-sectional views of a detail of the adjusting mechanism.

Referring to the drawing, a casing 4 houses in a compartment 6 thereof a drive sprocket 7 with its pad rollers 9 and 10. There is also included in compartment 6 an idler roller 12, a guide roller 13, with its guiding pad roller 15, a film gate shoe 17, a flywheel roller 18 with its spring pressed roller 21, a guide roller 22, a film stiffening shoe 24, and a guide roller 23. This apparatus drives and guides a film 25 through the sound unit, as illustrated in the drawing, the film, of course, being supplied from supply and take-up reels, not shown.

The invention is disclosed embodied in a sound recording unit in which modulated light is impressed upon the film at a translation point 27 through an optical system, not shown, as the film is maintained against the shoe 17 by any suitable gate. The flywheel roller 18 has a flange 28 thereon against which the film is maintained by tilting a common shaft 30 of the roller 18 and the flywheel 19, as will be described later. The film is also guided prior to reaching the translation point by the pad roller 15 having a spring flange 32 thereon which urges the film against opposing flange 33 (see Fig. 2), such a pad roller being disclosed and claimed in co-pending application Serial No. 25,423 filed June 7, 1935.

Referring now to Fig. 3, the roller 18 and flywheel 19 have their shaft 30 mounted on roller bearings 34 and 35, the bearings being fixed in a specially formed bracket 36 which projects through a mounting plate 5 but does not make contact therewith. A ring of felt 37 fills the gap between the bracket 36 and the plate 5. The bearing portion of the bracket 36 has a cylindrical surface 38 formed in a slot 39, as shown in Fig. 1. This slotted arrangement maintains the surface 38 in position on a mounting or supporting bracket 41 attached to the plate 5 by screws 42. A bolt 43 is fixed to the bearing bracket 36 and extends through an oversized stepped opening 45 in the supporting bracket 41, the lower portion 46 of the opening being elongated as shown in Figs. 4 and 5. Movement of the bolt 43 in the plane of the paper, therefore, will tilt the shaft 30 in the plane of the paper or in a vertical plane. The bracket 36, however, is prevented from moving in any other direction by the slot 39.

Referring now to Figs. 4 and 5, together with Fig. 3, a cylindrical bushing 47 with an enlarged hexagonal top is fitted in the large portion 46 of the opening 45 and accommodates the bolt 43 in an eccentric hole therein. A washer 48 having a slot 49 slidable on a pin on bracket 41 surrounds the bushing 47, this washer having the same curvature as that of the lower surface of bracket 41 which has a radius $R_1$ with a center O corresponding to the median line of the film. The upper surface of bracket 41 or lower surface of bracket 36 has a curvature with radius R₂ with the same center O. The axis of the shaft 30 is in effect pivoted at point O. A coil spring 50 abuts the eccentric drilled bushing 47 and the shoulder formed by the steps of the opening 45. The bushing 47 is maintained against the tension of the spring 50 and in fixed position with respect to the bracket 45 by a locknut 51 threaded on the end of bolt 43.

To adjust the angle of the shaft 30 in the plane of the paper, which is also the plane of the film at the point of contact between the roller 18 and its spring pressed roller 21, it is only necessary to loosen the nut 51 and turn the bushing 47 with a wrench to the desired degree. The nut 51 is then tightened. What causes the angular adjustment is the eccentricity of the opening in the bushing 47 into which the bolt 43 is fitted. Fig. 4 shows one extreme position of adjustment, the center line 53 representing the axis of the shaft 30. Fig. 5 shows the position of the bushing 47 in its horizontal or neutral position in which case the thicker portion of the bushing fills the lower part of the elongated opening 46. By making the opening 46 elongated, no angular displacement of the bolt 43 in a plane perpendicular to the shaft 30 is obtained, the only direction of movement of the bolt 43 being in the desired plane.

In this type of film driving and guiding, the film is maintained against the surface of the roller 18 by the spring pressed roller 21 under action of a tension spring 55 operating upon a pivoted lever 56 having a notch 57 therein for holding the roller 21 in film threading position. The roller 21 is mounted upon a yoke 59, the shaft of the roller 21 being fitted in a notch in the end thereof and held in the notch by a flat lever spring 60. A hand knob 61 facilitates opening and closing the roller. With this spring pressed roller arrangement, a uniform pressure is maintained on the film as it contacts the surface of roller 18. Roller 18, as mentioned above, is rotated by the pull of the film and maintains a uniform speed of rotation by the inertia of the flywheel 19. The drag on the film caused by the abaxial relationship between the shaft of the roller 18 and the shaft of the roller 21, as disclosed in copending application Serial No. 28,648, filed June 27, 1935, mentioned above, urges the film toward the flange 28 and maintains it at a fixed position with respect to the translation point 27. Before reaching the translation point, the film is also positioned by the spring flange of the pad roller 15.

Although the present device is a sound recorder wherein raw film is light impressed with sound modulated light, it may also be used for reproducing, or the recording may be monitored by the use of a photo-sensitive device, such as a selenium cell 63, disclosed and claimed in copending application Serial No. 16,578 filed April 16, 1935. For sound monitoring, the light impressed upon the film passes through an opening in the shoe 17 and impinges upon the light sensitive surface of the selenium cell 63. The cell 63 is held in position by electrical contact springs 64 which are mounted on the plate 5, insulated therefrom, and terminated in electrical terminals 66. These terminals may be connected to an amplifier and the recording monitored by the light which emerges from the film. For reproducing, the apparatus functions in the same manner except that the film passing therethrough already has a developed record thereon, and the light beam projected on the film is of constant intensity.

What is claimed is:

1. A film drive comprising a roller having a flywheel adapted to rotate therewith, a second roller adapted to exert a predetermined pressure on said roller, a bracket for the shaft of said roller and flywheel, said bracket having a cylindrical base, a second supporting bracket having a cylindrical surface for accommodating the base of said first bracket, a bolt fixed to said first bracket and passing through an opening in said second bracket, and an eccentric bushing surrounding said bolt and positioned in the opening of said second bracket, the angular position of said bushing determining the position of the axis of rotation of said roller and flywheel.

2. A film drive comprising a roller having a flywheel integral therewith, a second roller producing a predetermined pressure on said flywheel roller, means for advancing a film between said rollers, said rollers and flywheel being rotated by said film, a support for said flywheel and roller having a cylindrical base, a fixed support for accommodating said base and having an opening therein, and means attached to said support and passing through said opening for varying the position of the axis of rotation of said flywheel roller with respect to the direction of movement of said film.

3. A sound unit comprising means for advancing film therethrough, a plurality of guide rollers for determining the direction of travel of said film, means for positioning the surface of said film with respect to a light beam, a roller having a flywheel integral therewith for stabilizing the speed of advancement of said film at the point of contact between said light beam and said film, a second roller maintaining a predetermined pressure of said film against said flywheel roller, said rollers being rotated by the pull of said film, a mounting for said flywheel roller and flywheel, said mounting having a curved base, a support for said mounting having a curved top cooperating with said curved base, means inter-connecting said support and mounting for adjusting their relative positions along the curve of said base, and means for positioning the edge of said film at said contact point, said means being located immediately before and after said contact point.

4. An adjustable mounting for a film-pulled roller and flywheel comprising a shaft having said roller and flywheel mounted thereon, a bearing support for said shaft having a cylindrical surface whose radius of curvature has a center corresponding to the median line of said film on said roller, a fixed bracket for accommodating said cylindrical surface and having an opposite curved surface whose radius of curvature coincides with that of said first radius, said bracket having an opening therein, means fixed to said shaft bracket and positioned in said opening, and means for adjusting the position of said last mentioned means to control the axis of rotation of said roller and flywheel shaft.

5. Means for adjusting an axis of rotation of a shaft in the plane of said axis comprising a bracket for supporting said shaft having a curved base whose radius of curvature has a center on said axis, a fixed supporting bracket having an elongated opening therein and a surface with the same curvature as said first bracket, said brackets being adapted to move relatively to one another on said surfaces solely in one direction, means attached to said first bracket and passing through said opening, said means being adapted to adjust said axis in a definite plane including said axis, and a cylindrical bushing positioned in said elongated opening and having an eccentric hole therein to accommodate said last mentioned means, the angular position of said bushing determining the position of said axis in said definite plane.

6. An adjustable mounting for a film pulled roller and flywheel comprising a shaft having said flywheel and roller mounted thereon, a bracket having a cylindrical surface of a definite curvature, a fixed bracket for accommodating said curvature and having an opening therein, a bolt attached to said first bracket and positioned in said opening, said opening being elongated in a plane perpendicular to the plane of said axis, a bushing positioned in said elongated opening and accommodating said bolt in an eccentric hole in said bushing, angular displacement of said bushing determining the position of said bolt in proportion to the eccentricity of said bushing, and means for maintaining said bolt in fixed position on said support.

7. A film drive comprising a roller, a second roller associated with said first roller, means for advancing a film between said rollers, said rollers being rotated by said film, a mounting for said first mentioned roller, said mounting having a curved base, a fixed support for said mounting, said support having a curved top co-operating with the curved base of said mounting, and means connecting said mounting and said support for adjusting the relative positions therebetween, said adjustment varying the position of the axis of said first roller with respect to said second roller.

8. A film drive in accordance with claim 7 in which means are provided for positioning the surface of said film prior to its reaching said rollers and means are provided for positioning the edge of said film prior to its reaching said surface positioning means.

9. A film drive system comprising a roller adapted to be rotated by film passing thereover, a second roller co-operating with said first roller for maintaining contact of said film with said roller at a predetermined pressure, bearings for said first roller, a mounting for said bearings, said mounting having a base with a cylindrical curvature, a fixed support for supporting said mounting, the top of said support accommodating the cylindrical curvature of the base of said mounting, and means fixedly attached to said mounting and passing through said support for rotating said mounting with respect to said support, said mounting varying the position of the axis of the bearings of said first mentioned roller with respect to the axis of the bearings of said second mentioned roller.

ERNEST ROSS.
HAROLD J. HASBROUCK, Jr.